United States Patent [19]

Iijima

[11] Patent Number: 4,983,816
[45] Date of Patent: Jan. 8, 1991

[54] PORTABLE ELECTRONIC DEVICE
[75] Inventor: Yasuo Iijima, Baba, Japan
[73] Assignee: Kabushiki Kaisha Toshiba, Kawasaki, Japan
[21] Appl. No.: 310,538
[22] Filed: Feb. 14, 1989
[30] Foreign Application Priority Data Feb. 24, 1988 [JP] Japan .................................. 63-39594
Feb. 26, 1988 [JP] Japan .................................. 63-43465
Apr. 15, 1988 [JP] Japan .................................. 63-93117

[51] Int. Cl.$^5$ ............................................. G06K 15/30
[52] U.S. Cl. ..................................... 235/379; 235/380; 235/492
[58] Field of Search .......................... 235/379, 380, 492

[56] References Cited

U.S. PATENT DOCUMENTS 4,887,234 12/1989 Iijima .................................. 235/380

FOREIGN PATENT DOCUMENTS 62-190585 8/1987 Japan .

Primary Examiner—Harold I. Pitts
Attorney, Agent, or Firm—Cushman, Darby & Cushman

[57] ABSTRACT

In an IC card (electronic smart card) which can record or register a plurality of personal identification numbers (PINs), an externally entered personal identification number is collated with the personal identification numbers registered in the card, and when a coincidence occurs between the entered PIN and one of the registered PINs, a flag is set to indicate coincidence therebetween. At least two of the registered PINs share the same flag information. Each noncoincidence between an entered PIN and a registered PINs is counted. Response data indicating the unusability of the PIN is issued when the number of noncoincidences exceeds a predetermined value, while when the number of noncoincidences is below the predetermined value, response data indicating the PIN noncoincidence is issued. In counting the number of noncoincidences, the first count is made by a nonvolatile memory so that it may not be erased when a power supply is turned off and the subsequent counts are made by a nonvolatile memory.

13 Claims, 18 Drawing Sheets

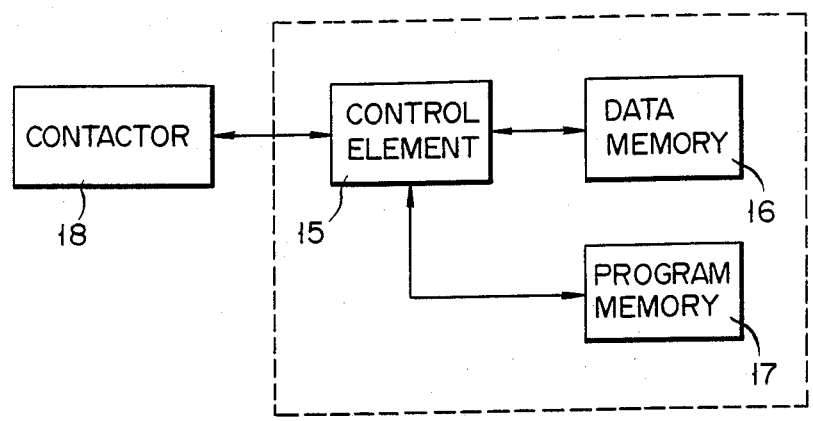
F I G. 3
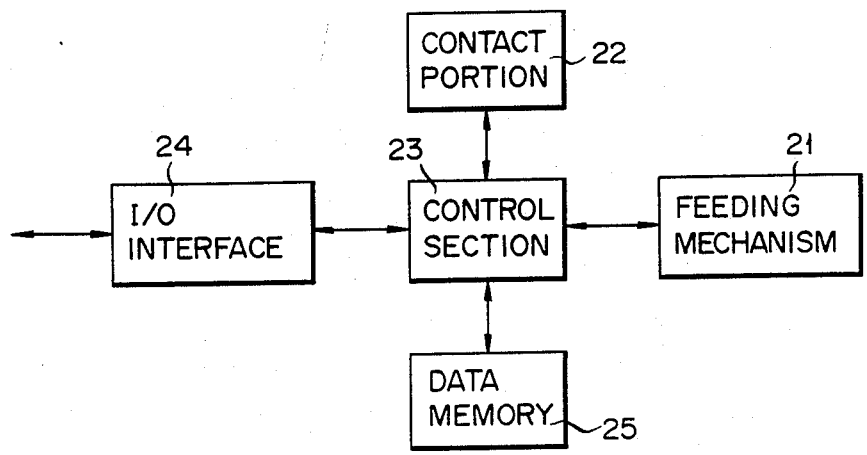
F I G. 4

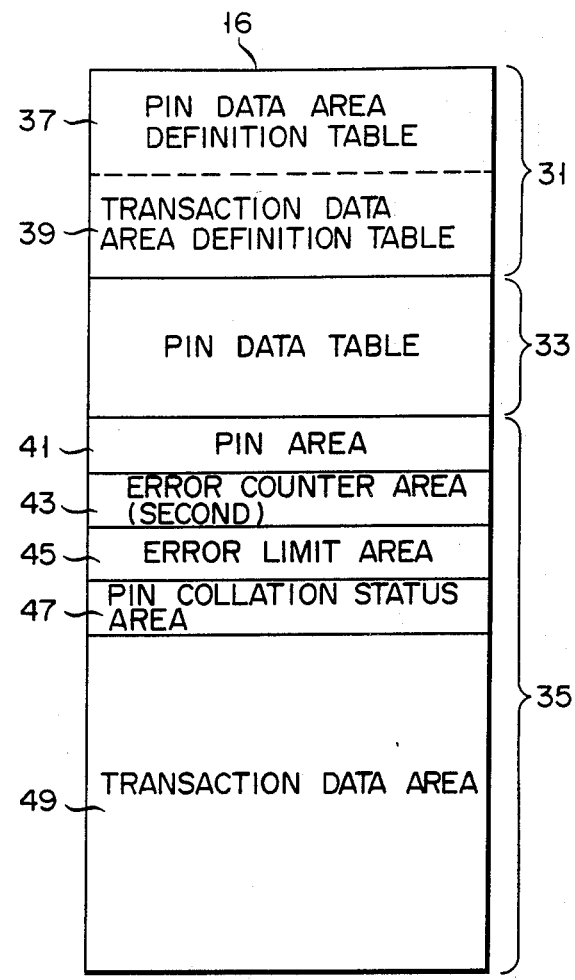
F I G. 5

FIG. 6

| 51 | 53 | 55 |
|---|---|---|
| 01 | TA01 | 10 |
| 02 | TA02 | 10 |
| 03 | TA03 | 10 |
| 04 | TA04 | 5 |
| 05 | TA05 | 5 |
| 11 | TA11 | 1 |
| 12 | TA12 | 1 |
| 13 | TA13 | 1 |
| 21 | TA21 | 1 |
| 22 | TA22 | 1 |
| 23 | TA23 | 1 |
| 24 | TA24 | 1 |
| 41 | TA41 | 1 |
| 42 | TA42 | 1 |
| 43 | TA43 | 1 |
| 44 | TA44 | 1 |

FIG. 7

| 57 | 59 | 61 | 63 |
|---|---|---|---|
| 80 | TA80 | S80 | 04 |
| 81 | TA81 | S81 | 02 |

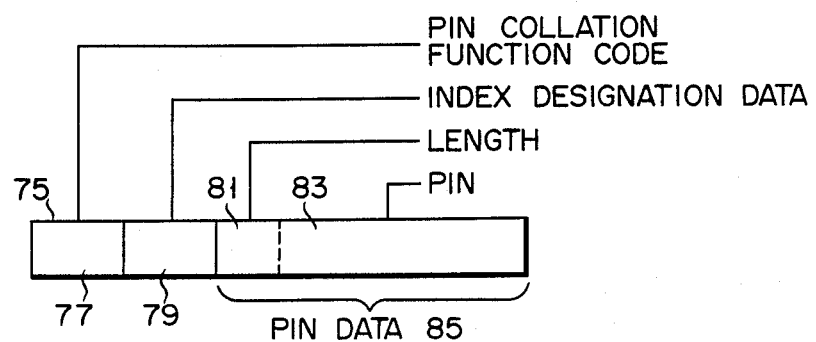
|   | 65 | 67 | 69 | 71 | 73 |
|---|----|----|----|----|----|
|   | 31 | 01 | 11 | 21 | 41 |
|   | 32 | 02 | 12 | 22 | 42 |
|   | 33 | 03 | 12 | 23 | 42 |
| 33 | 34 | 04 | 13 | 24 | 43 |
|   | 35 | 05 | 13 | 24 | 44 |
F I G. 9
F I G. 10

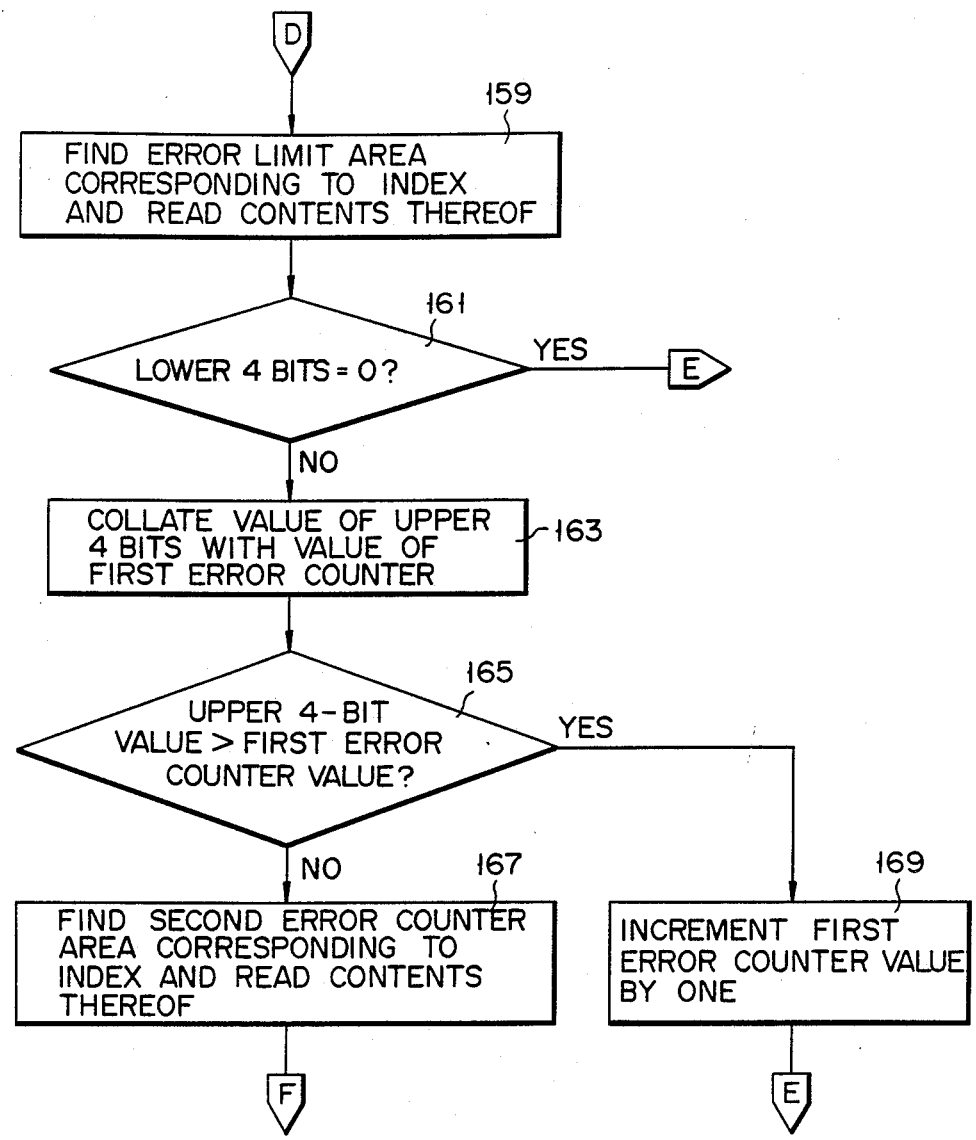
F I G. 18C

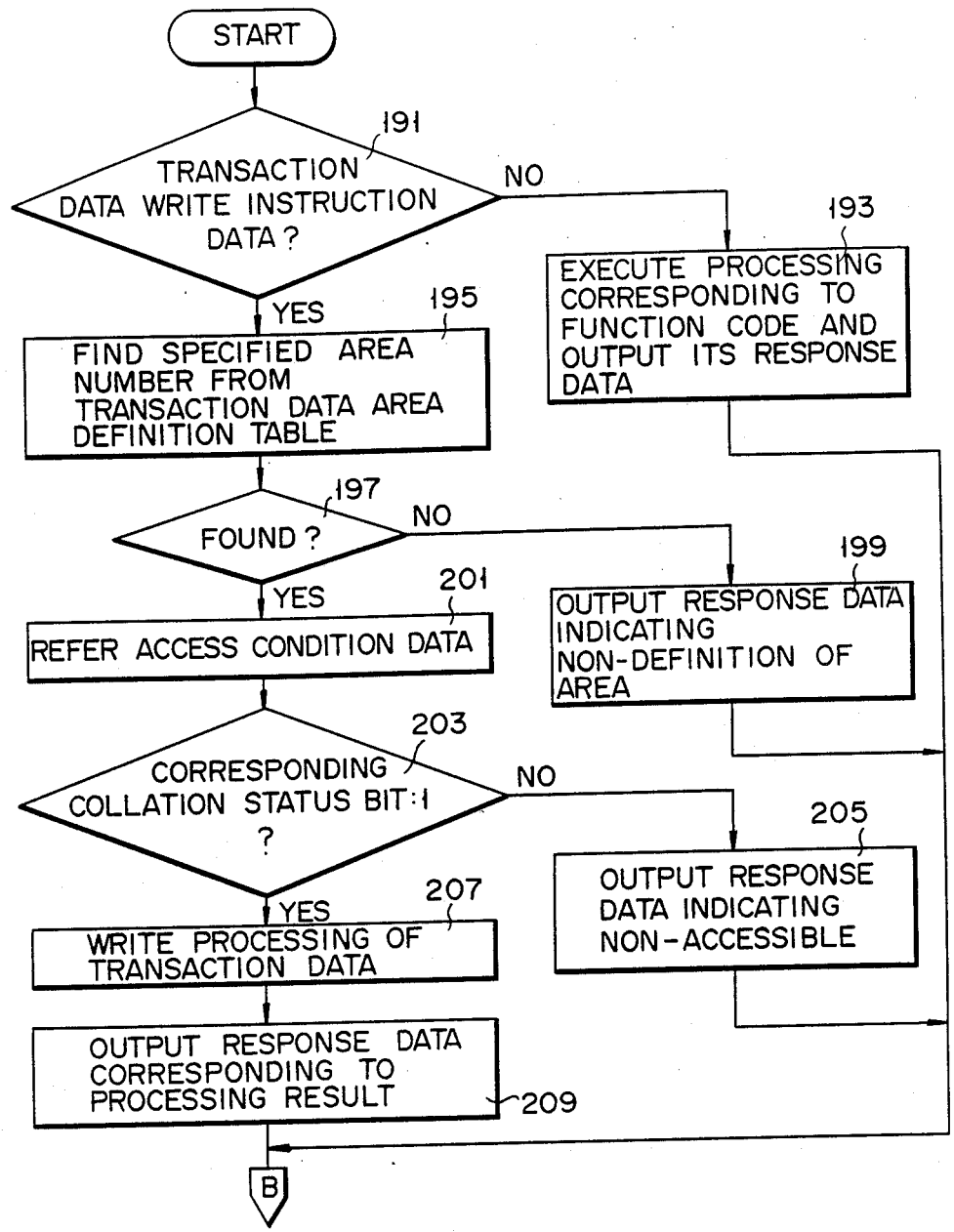
F I G. 19

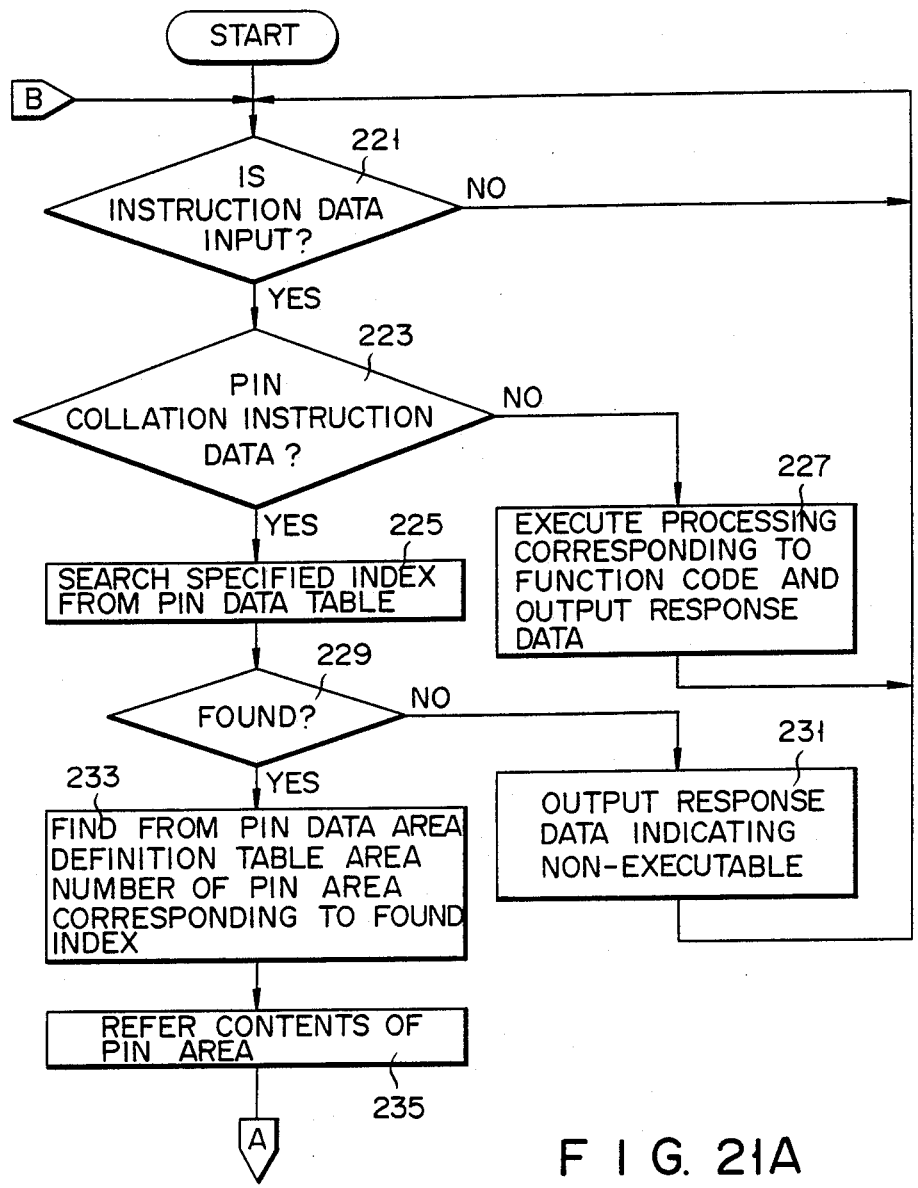

PORTABLE ELECTRONIC DEVICE

BACKGROUND OF THE INVENTION

1. Field of the Invention

The present invention relates to a portable electronic device such as an IC card (electronic smart card) for use as a credit card or cash card.

2. Description of the Related Art

So-called magnetic cards, i.e. cards with a magnetic stripe, such as credit cards or cash cards, are now in widespread use. In recent years, however, IC cards have become the subject of considerable attention as a replacement for magnetic cards. An IC card, or electronic smart card, incorporates a microchip having an erasable nonvolatile memory and a control device, such as a central processor unit (CPU), which controls the memory. Because of the provision of a memory an IC card has an increased storage capacity, compared to a magnetic card, enabling the card user to perform various transactions on the basis of account information stored therein. In processing a transaction data, an input personal identification number (PIN) is collated with a stored PIN to ascertain that the user is the owner of the card.

One or a plurality of identification numbers are stored in a memory of the card. A PIN externally entered by the user is collated with a specified registered PIN within the card. A plurality of PINs will be needed from a view point of multipurpose and security of the IC card.

A conventional IC card stores information as to the affirmative result of collation of an identification number in a memory, such as a random access memory (RAM), provided in a microprocessor. When the collation of the identification number is correctly performed, the information as to the affirmative result of the collation is used as identification information for the card to confirm that which of identification numbers in the memory has been collated during subsequent operations. The information about the collation affirmative result is inherently set for each of the identification numbers.

Furthermore, another type of IC card is being developed in which a plurality of PINs of a card owner are recorded. In this IC card, a different PIN can be used depending on applications. In this type of IC card, the user can register additional applications, the number of PINs increase accordingly. The collation affirmative results are provided corresponding to the respective PINs and stored in a predetermined area of a memory.

In the conventional IC card, however, the size of an area to store the collation affirmative results is predetermined. Hence, if the additional applications are registered, the area size might be expanded in order to store the additional collation affirmative reuslsts. The expansion of the area size will destroy a data area in which other data are stored. Even if the collation affirmative results can be stored in a predetermined areas, an increase of the results would complicates to access a desired collation affirmative result.

Moreover, if the noncoincidence of the PINs occurs, the number of noncoincidences is counted. The number of noncoincidences is accumulated in the card for comparison with a predetermined upper limit value previously registered in the memory. When the number of noncoincidences exceeds the upper limit value, the corresponding PIN cannot be used any more.

Assume that only one kind of response data is issued from the card to external equipment when the collation results in noncoincidence the external equipment cannot recognize that the issued response data indicates the noncoincidence of PIN or the number of noncoincidences excessing the upper limit value. If the external equipment could read the upper limit value for the identification number which is under collation, the equipment could determine the reason for impossibility of the use of the identification number.

Accordingly, a method might be devised by which the external equipment reads the upper limit value for the identification number for collation out of the IC card. However, this would considerably endanger the security for the IC card.

A second method might be devised by which the upper limit value is previously registered in the external equipment. In such an IC card system that a plurality of identification numbers are recorded in each IC card and the upper limit values therefor differ, however, the load of the external equipment would be remarkably large.

In a conventional magnetic card system, when the noncoincidence of identification number occurs, equipment, such as an automatic teller machine (ATM), temporarily counts the number of noncoincidences and marks a predetermined location in the magnetic strip of a magnetic card when the count value reaches a predetermined number of noncoincidences. As a result, the number of repetitions of the predetermined number of noncoincidences (for example, a marking is made every three times of noncoincidence and up to three markings are made) can be recognized to determine the usability or unusability of the magnetic card.

Even in the case where IC cards are used with the magnetic card system, the above process of noncoincidence of identification numbers for the magnetic card system must be implemented. A counter for counting the number of noncoincidences (referred to as the noncoincidence counter) must be provided in a nonvolatile memory in an IC card in order to retain the noncoincidence data. Where the noncoincidence counter is provided for each of identification numbers, complicated control would be needed for the application of the magnetic card system.

For this reason, two noncoincidence counters might be provided, one in a volatile memory (RAM) and the other in a nonvolatile memory. In this case, the noncoincidence counter in the volatile memory is counted up each time an noncoincidence occurs between an entered identification number and the registered identification number and, when counted up to a predetermined number, the noncoincidence counter in the nonvolatile memory is incremented by one. This method can present a pseudo noncoincidence processing as that of the magnetic card system.

According to that method, however, since the first noncoincidence is counted by the noncoincidence counter in the volatile memory, the correct identification number might be detected by repeating an operation of stopping the supply of electric power to the IC card in order to erase the contents of the volatile memory deliberately each time an noncoincidence occurs, and entering a different identification number for collation after the resupply of the electric power. During the operation the noncoincidence counter in the nonvolatile memory is never counted up.

SUMMARY OF THE INVENTION

It is accordingly a object of the present invention to provide a portable electronic device which prevents the increase of a memory area for storing information on affirmative results of collation of PINs, the information being inherent in each PIN, and facilitates the reference to the information on affirmative results of collation of PINs even if applications are added.

It is another object of the present invention to provide a portable electronic device which can recognize whether the number of noncoincidences of PIN has reached an upper limit value even if external equipment knows no upper limit value for the PIN under collation and can maintain the system security.

It is still another object of the present invention to provide a portable electronic device which can implement a process for noncoincidence between an entered PIN and a registered PIN without complicating internal control and can save the status of noncoincidence of the PINs reliably.

BRIEF DESCRIPTION OF THE DRAWINGS

FIG. 3 is a general block diagram of the IC card;

FIG. 4 is a general block diagram of the IC card reader-writer;

FIG. 5 shows memory allocation of the data memory according to an embodiment of the present invention;

FIG. 6 shows in detail the personal identification number (PIN) area definition table shown in FIG. 5;

FIG. 7 shows in detail the transaction data area definition table shown in FIG. 5;

FIG. 9 shows in detail the PIN information table shown in FIG. 5;

FIG. 10 shows a format of the PIN collating instruction used in the present invention;

FIGS. 18A through 18D are a flowchart showing the operation for collating a personal identification number;

FIG. 19 is a flowchart used for explaining the operation for writing transaction data;

FIG. 20 shows a format of instruction data for writing the transaction data; and FIGS. 21A through 21D are a flowchart for explaining the collating operation for a personal identification number according to the other embodiment of the present invention.

DETAILED DESCRIPTION OF THE PREFERRED EMBODIMENTS

Figure 1:
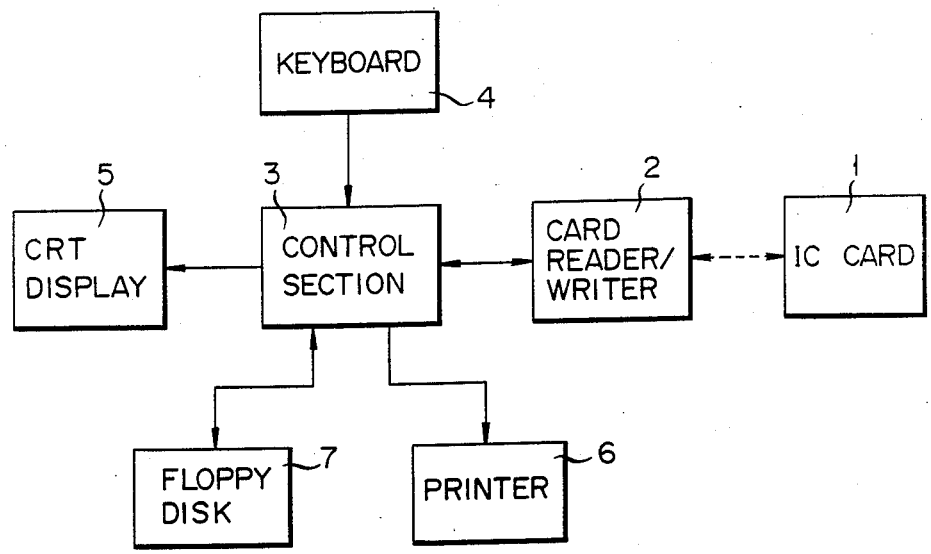
FIG. 1 is a block diagram of terminal equipment including a card reader-writer for an IC card used as a portable electronic device of the present invention.

Referring now to FIG. 1, terminal equipment, which handles an IC card serving as a portable electronic device of the present invention, comprises a card reader/writer 2 adapted to connect IC card 1 to a control section 3 comprised of a central processing unit (CPU), a keyboard 4, a CRT (cathode ray tube) display 5, a printer 6 and a floppy disk system 7 which are connected to control section 3.

Figure 2:
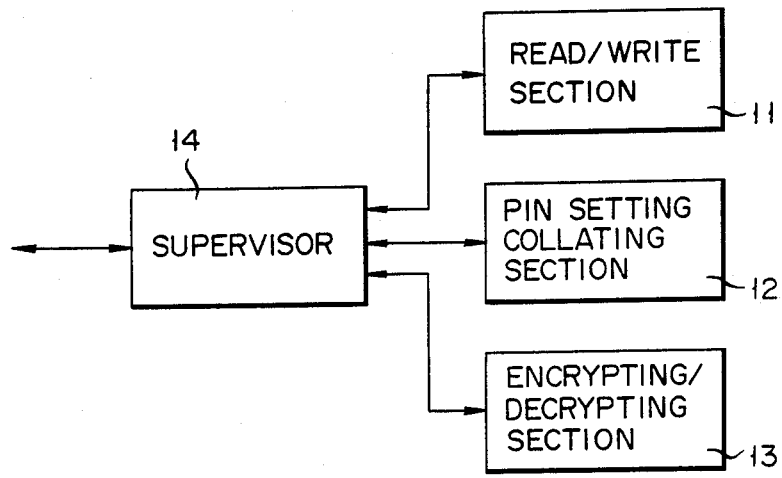
FIG. 2 is a conceptual diagram showing general functions of the IC card.

IC card 1 is held by a user and is used for making reference to a personal identification number (PIN) that only the user knows and storing necessary data when the user makes purchases, for example. As shown in FIG. 2, IC card 1 may be composed of a read/write section 11, a PIN setting and collating section 12, an encrypting/decrypting section 13 and a supervisor 14 for super-vising basic functions such as rewriting/writing, PIN setting and collating, encrypting and decrypting.

Read/write section 11 is adapted to write data into and read data from a data memory and erase data. PIN setting and collating section 12 performs processes for storing PINs set by the user and prohibiting the PINs from being read out. The PIN setting and collating section further performs collation with a set PIN and gives permission to perform subsequent processes. Encrypting/decrypting section 13 encrypts data which is transmitted from control section 3 to another terminal equipment via a communication line and decrypts encrypted data in order to preclude the leakage and forgery of communication data. In this case, a cryptographic algorithm of sufficient strength, such as Data Encryption Standard (DES), may be used. Supervisor 14 decodes functional codes o data-added functional codes entered from card reader/writer 2 to cause the above basic functions to be selectively performed.

In order for IC card to exhibit these basic functions effectively, the card is, as shown in FIG. 3, composed of a control element (control section) 15 such as a CPU, a data memory (memory section) 16, a program memory 17 and a contactor 18 for electrical connection to card reader/writer 2. Control element 15, data memory 16 and program memory 17 forms a single integrated circuit chip (alternatively a plurality of chips) and are embedded in the body of IC card 1. Program memory 17 is formed of, for example, a mask ROM (read only memory) and adapted to store a control program including subroutines for implementing the basic functions and executed by control element 15. Data memory 16 is used for storing various types of data and formed of an erasable nonvolatile memory such as EEPROM (electrically erasable programmable read only memory).

Card reader/writer 2 is adapted to transfer function codes and data between IC card 1 and control section 3. Card reader/writer 2 also has a function to perform a one-response-for-one-instruction operation for IC card 1 on the basis of a macro instruction from control section 3. More specifically, card reader/ writer 2 comprises, as shown in FIG. 4, a feeding mechanism 21 for feeding the card inserted in a card slot not shown to a predetermined position, a contact portion 22 for electrical connection to contactor 18 of the card placed in position, a control section 23 comprised of a CPU for performing the whole control, an input/output (I/O) interface circuit 24 for transferring instruction data and response data between control sections 23 and 3 and a data memory 25 for storing data.

Data memory 16 is classified broadly into an area definition table 31, a PIN data table 33 and a data area 35 as shown in FIG. 5, for example. Area definition table 31 comprises a PIN data definition table 37 and a transaction data area definition table 39.

PIN data area definition table 37 stores definition information for defining a PIN data area 41 in data area 35. The definition information is a set of data strings each comprised of, for example, an area number 51, an area start address 53, an area size 55 as shown in FIG. 6.

Transaction data area definition table 39 stores definition information for assigning a transaction data area 49 in data area 35. The definition information is a set of data strings each comprised of, for example, an area number 57, an area start address 59, an area size 61 and an access condition 63 as shown in FIG. 7.

Figure 8:
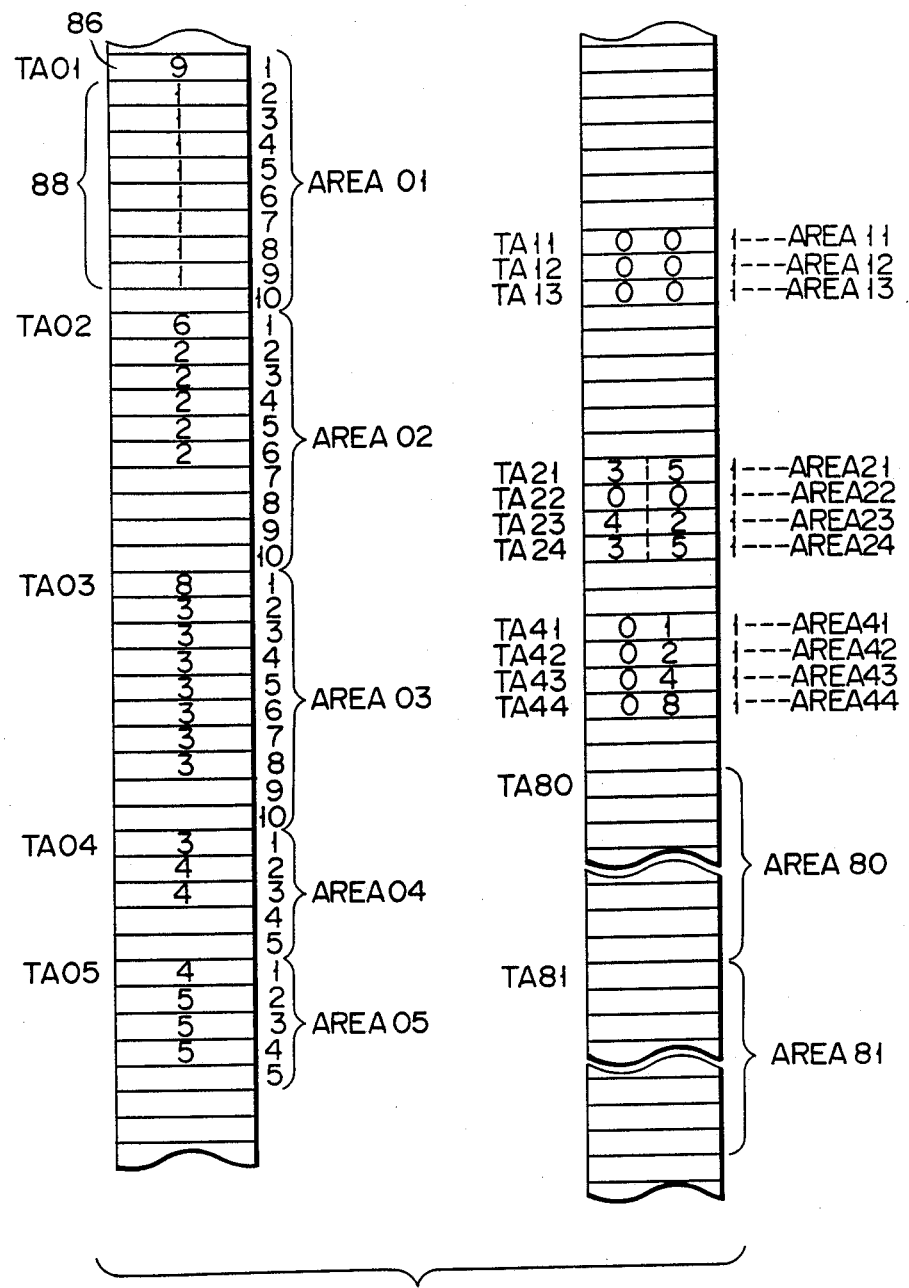
FIG. 8 shows in detail allocation of the data area shown in FIG. 5.

Data area 35 is defined by PIN data area definition table 37 and transaction data area definition table 39 and stores various data including a PIN data area 41, a second error counter area 43, an error limit area 45, a PIN collation status area 47 and a transaction data area 49. FIG. 8 shows data area 35 in detail. In FIG. 8, areas 01 through 05 represent PIN area 41, areas 11 through 13 second error counter 43, areas 21 through 24 error limit area 45, areas 41 through 44 PIN collation status area 47 and areas 80 and 81 transaction data area 49.

PIN data table 33 is a set of data strings each comprised of an index section 65, an area number section 67 for the PIN area, an area number section 69 for the error counter area, an area number section 71 for the error limit area and an area number section 73 for the PIN collation status section as shown in FIG. 9, for example.

Index section 65 corresponds to index designation data 79 of PIN collation instruction data 75 (to be detailed later) of FIG. 10. In this case, index section 65 is searched with index designation data in the PIN collation instruction data taken as a parameter. If the designated index is found in index section 65, then the corresponding PIN becomes a target of collation.

Area number 67 for the PIN area stores an area number of PIN are 41 in data area 35 in which the PIN designated for collation is stored.

Figure 11:
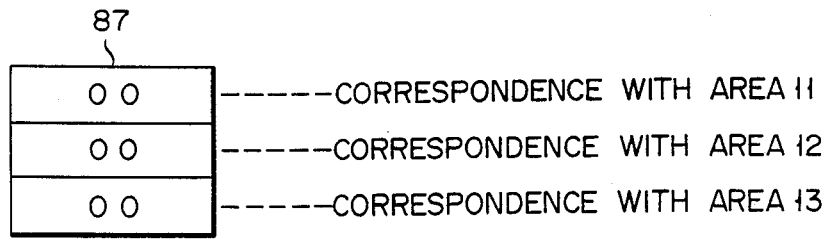
FIG. 11 shows areas of a first error counter used in the present invention.

Area number section 69 for the error counter area is adapted to designate first error counter 87 (FIG. 11) in the RAM not shown in control element 15 and store an area number of second error counter area 43 in data area 35.

Figure 12:
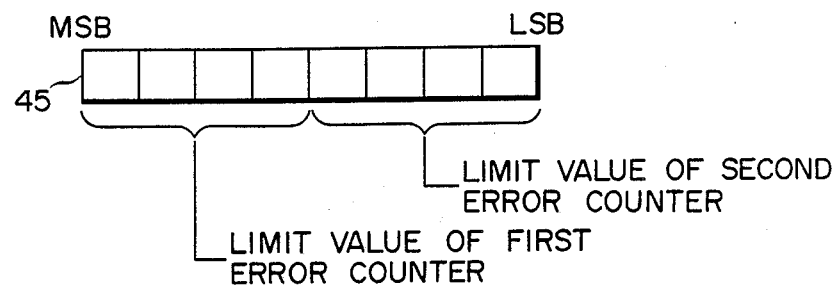
FIG. 12 shows formats of limit values for first and second error counter values.

Area number section 71 for the error limit area stores an area number of error limit area 45 which stores limit values of first and second error counters 87, 43. Error limit area 45 is a one-byte area and, as can be seen from the format of FIG. 12, the upper four bits represent the limit value of the first error counter and the lower four bits represent the limit value of the second error counter.

Area number section 73 for the PIN collation status area represents a number of PIN collation status area 47 in data area 35. PIN collation status area 47 stores information to indicate that which of collation status bits 89 (FIG. 13) in the RAM of control element 15 should be set to a collation status flag.

For example, when "31" is designated in index designation data section 79 of the PIN collation instruction data shown in FIG. 10, the corresponding area number in area number section 67 for the PIN area will be "01" as can be seen from FIG. 9. The number "01" is retrieved from PIN area definition table 37 of FIG. 6 and subsequently area 01 (FIG. 8) in PIN area 41 is referred to with corresponding area start address "TA01" and area size "10 bytes" taken as parameters. As a result, a PIN of "11111111" is obtained. Here PIN area 41 is comprised of a length part 86 representing the number of bytes of a one-byte PIN and a PIN part 88 of variable length as shown in FIG. 8. When length part 86 represents "FF" in hexadecimal, no PIN is stored.

Next, since the corresponding area number in area number section 69 for the error counter area is "11" as can be seen from FIG. 9, area 11 for second error counter area 43 of FIG. 8 is referred to on the basis of area start address "TA11" and area size "1 byte", so that a value of "00" for the second error counter is obtained.

Figure 13:
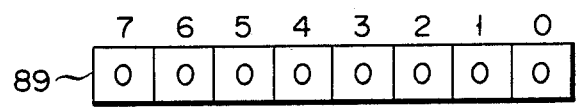
FIG. 13 shows a format of the PIN collation status flag.

In the same way, control element 15 of IC card 1 can recognize that a PIN designated by index "31" is "11111111" of 8-byte data, a value for the second error counter is "00", an error limit value is "3" for the first error counter and "5" for the second error counter and PIN collation status bit 89 corresponds to the 0-th bit of FIG. 13.

Next, the operation of the above embodiment of the present invention will be described.

Figure 14:
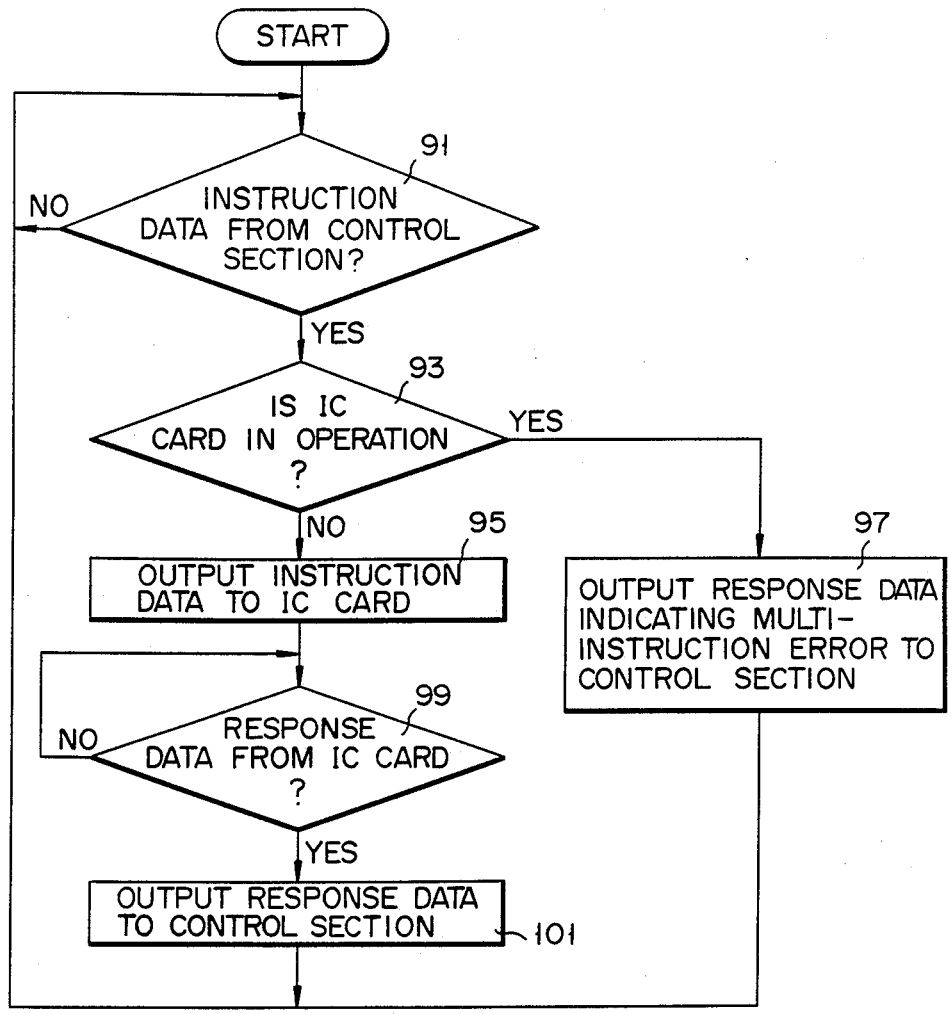
FIG. 14 is a flowchart of the operation of the IC card reader-writer.

Card reader/writer 2 operates in accordance with a flowchart shown in FIG. 14. That is, control section 23 determines, in step 91, whether instruction data has been entered from control section 3. If no instruction data has been entered, control section 23 waits for the instruction data to be entered. Upon determination of the entry of the instruction data from control section 91, control section 23 determines, in step 93, whether IC card 1 is in operation or not. When IC card 1 is in operation, control section 23 issues response data indicating multi-instruction error to control section 3 and returns to the wait state for instruction data in step 91. On the other hand, when IC card 1 is not in operation in step 93, control section 23 issues instruction data to IC card 1 in step 95 and enters the wait state for response data from IC card 1 in step 99. Upon receipt of response data from IC card 1 in step 99, control section 23 issues, in step 101, instruction data to IC card 1 again when the instruction is a macro instruction, otherwise control section 23 issues response data to control section 3 and is then placed in the wait state for instruction data.

Figure 15A:
FIGS. 15A and 15B show formats of instruction data entered into the IC card.
Figure 15B:
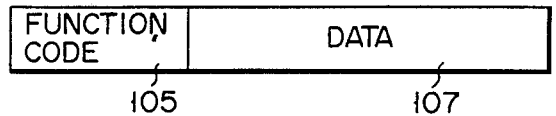

The instruction data issued by card reader/writer 2 to IC card 1 may consist of a function code 103 only, as shown in FIG. 15A or a function code 105 and data 107, as shown in FIG. 15B.

Figure 16:
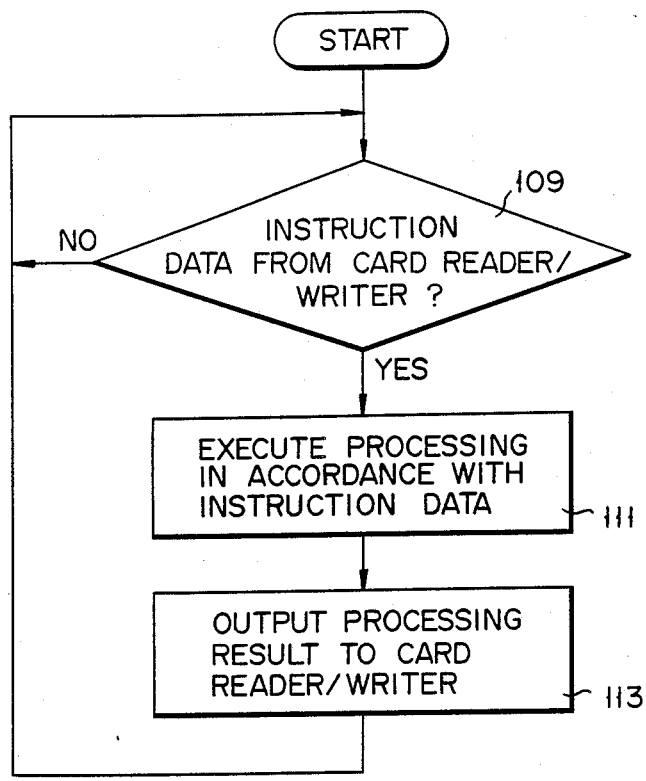
FIG. 16 is a flowchart showing the operation of the IC card.
Figure 17:
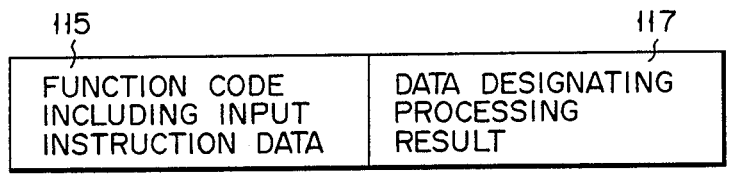
FIG. 17 shows a format of general response data issued from the IC card.
Figure 18A:
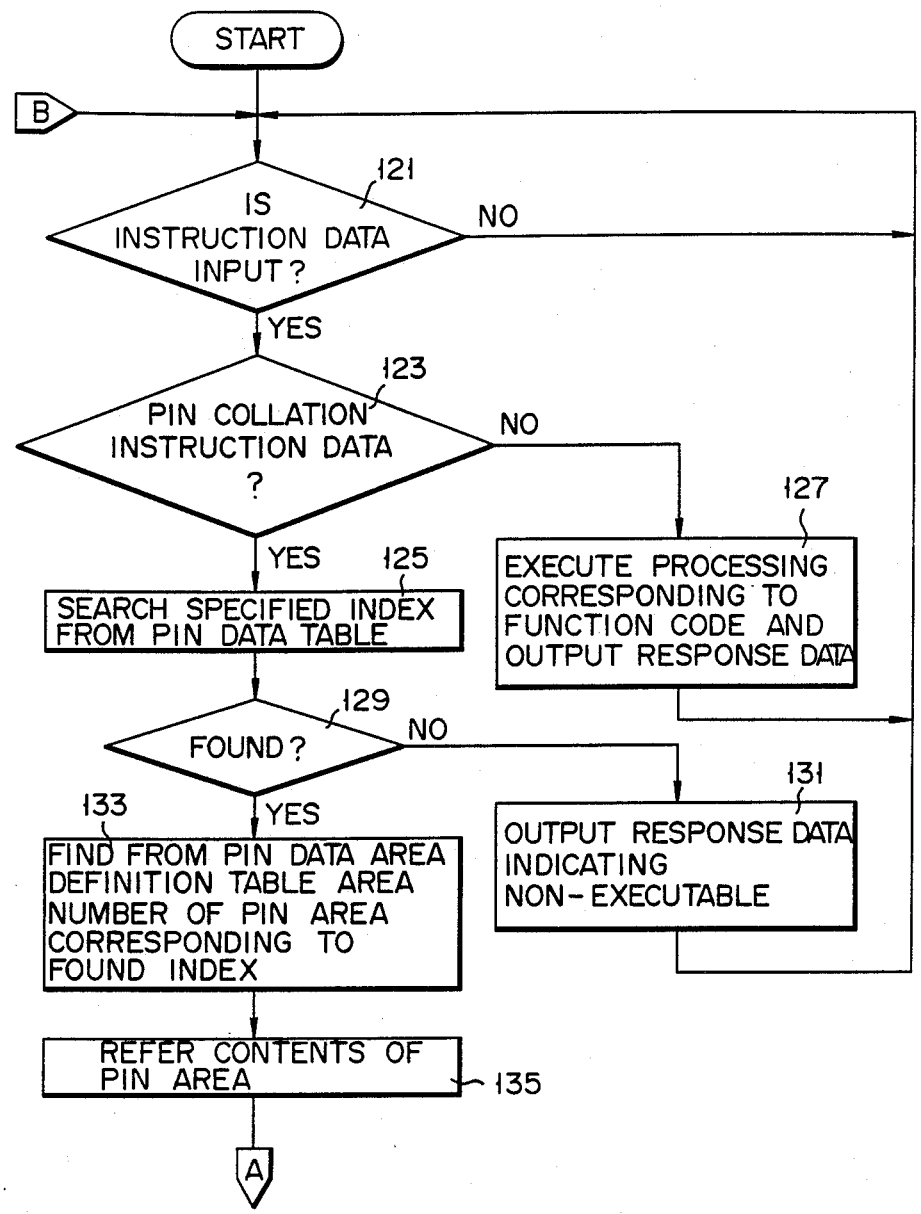
Figure 18B:
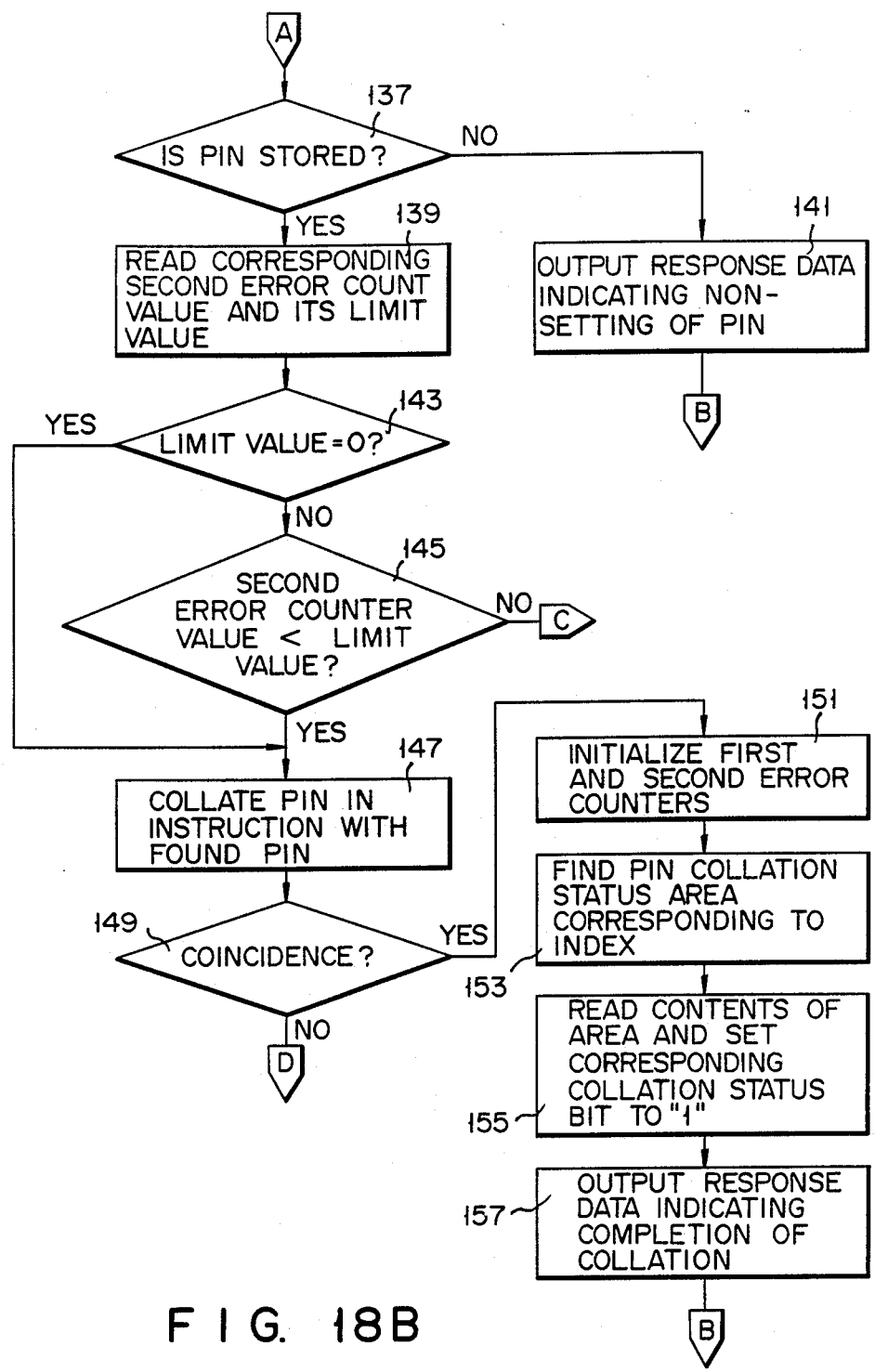
Figure 18D:
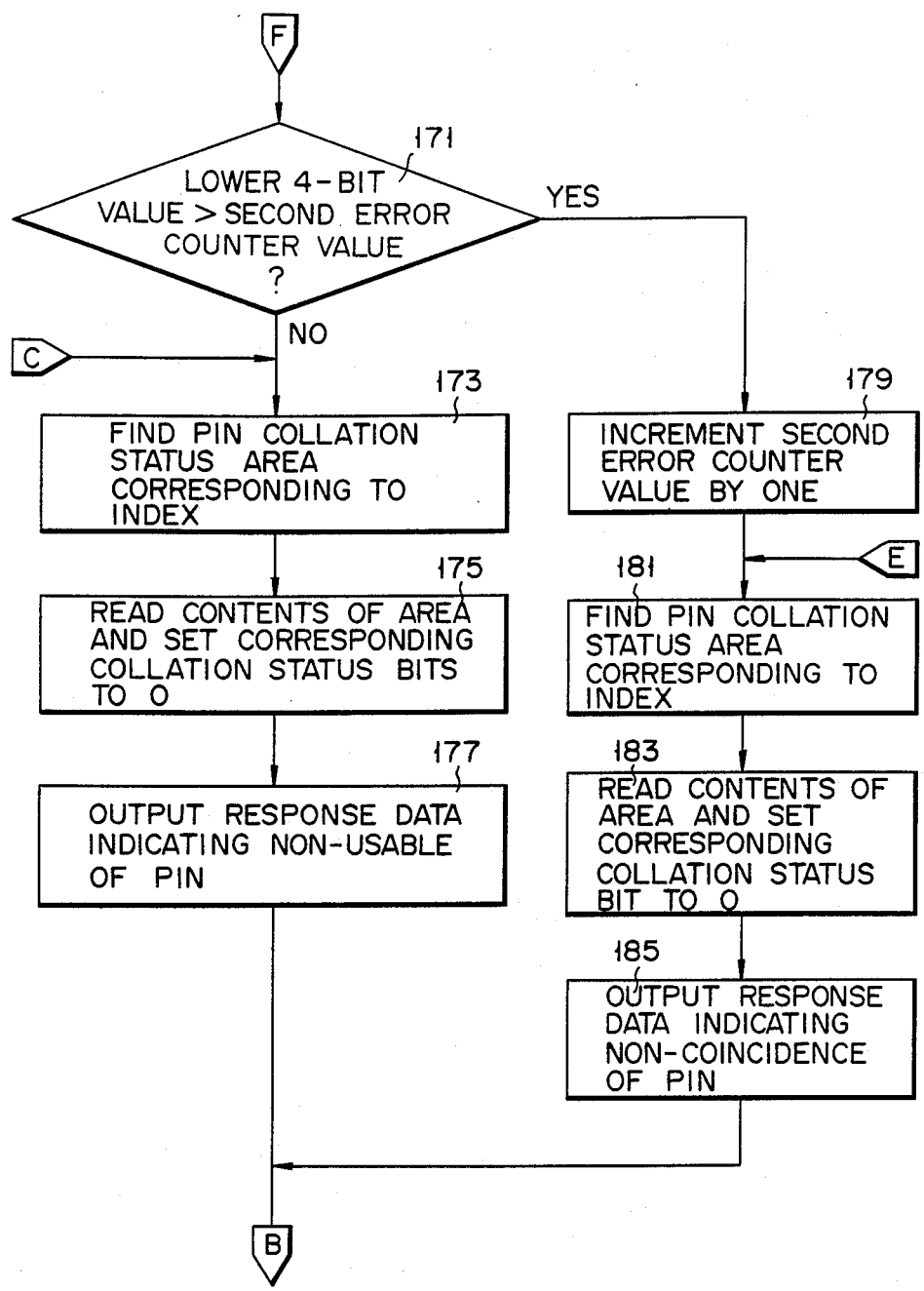

IC card 1 operates in accordance with a flowchart shown in FIG. 16.

That is, in step 109 IC card 1 normally waits for instruction data from card reader/writer 2. In this state, instruction data is entered from card reader/ writer 2, control element 15 executes a basic function on basis of the instruction data, issues response data indicating a result of the execution of the basic function to card reader/writer 2 and enters into the wait state for instruction data.

In this case the response data is comprised of a function code 115 included in the entered instruction data and data 117 indicative of the execution result. As a result, even if the sequence between card reader/writer 2 and IC card 1 is disturbed, it can be known that an execution result corresponds to which of function codes.

Next the collation of a personal identification number will be described with reference to a flowchart shown in FIG. 18A through FIG. 18D. In step 121 control element 15 determines whether instruction data has been entered. Upon receipt of instruction data, control element 15 determines whether the instruction data is the PIN collation instruction data having such a format as shown in FIG. 10 or not. As a result of the determination, if the instruction is not for the PIN collation, control element 15 decodes the function code in the instruction data and executes the corresponding process. Control element 15 then outputs response data for a result of the execution of the corresponding process and returns to step 121 for the wait state for instruction data.

When the instruction is for the PIN collation, control element 15 searches index section 65 of PIN data area definition table 33 in data memory 16 for an index coinciding with index designating data included in the instruction data, in step 125. When the index cannot be found in step 129, control element 15 issues response data indicating that the PIN collation is non-executable and enters into the wait state for instruction data in step 121. When the index is found in step 129, on the other hand, control element 15 finds out area number 67 of the PIN area corresponding to the index from PIN area definition table 33 in step 133. Control element 15 further refers to the contents of the PIN area in step 135. And a determination is made as to whether the PIN is stored or not in step 137. If length section 91 of the PIN area shows "FF" (Hex), then control element 15 determines that the PIN is not stored, issues response data indicating that the PIN is not set and enters into the wait state for instruction data in step 121.

If length section 91 of the PIN area indicates data other than "FF" (Hex), then control element 15 recognizes that the PIN is stored. Subsequently, in step 143, control element 15 reads the corresponding second error count value and its limit value and examines whether the limit value is 0 or not in step 143. If the limit value is 0, control element 15 performs the PIN collation in step 147, while if not 0, control element 15 makes a comparison between the second error count value and its limit value in step 145. As a result of the comparison, if the second error count value is smaller than the limit value, then control element 15 performs the PIN collation in step 147. If the second error count value is larger than the limit value, then control element 15 refers to the PIN collation status area corresponding to the index in step 173 and reads the contents of the area in step 175 to set the corresponding collation status bit to "0" in step 175. Control element 15 then issues response data indicating that the PIN is non-usable in step 177 and enters into the wait state for instruction data in step 121. That is, in the case of index 31, the PIN collation status area number is TA41 and area 41 of the PIN collation status area stores "01", thus setting the 0-th bit of the PIN collation flag of FIG. 13 to "0".

In the collating process of the PIN in step 147, the PIN in the entered instruction data is collated with the specified PIN stored in the IC card. When a coincidence occurs between both the PINs in step 149, control element 15 initializes first and second error counters 87 and 43 to "00" in step 153, refers to the PIN collation status area (areas 41, 42, 43 of FIG. 8) corresponding to the index in step 153, reads the contents of the PIN collation status area and sets the corresponding PIN collation status bit to "1" shown in FIG. 13 in step 155, issues response data indicating the completion of collation in step 157, and enters into the wait status for instruction data in step 121.

When no coincidence occurs in step 149, on the other hand, control element 15 refers to the error limit area corresponding to the index and reads out the contents of the area in step 159. Subsequently, in step 161, a determination is made as to whether the lower four bits (the limit value of the second error counter) of the read data are "0" or not. As a result of this determination, if they are "0", then control element 15 refers to the PIN collation status area corresponding to the index in step 183 of FIG. 18D, reads out the contents of the area and sets the corresponding PIN collation status bit to "0" in step 183, issues response data indicating non-coincidence of the PINs, and then enters into the wait state for instruction in step 121.

In step 161 (FIG. 18C), if the lower four bits of the error limit area are not "0", then control element 15 collates the upper four bits (the limit value of the first error counter) of the error limit area with the count value of the first error counter in steps 163 and 165. If the first error count value is smaller than the error limit value in step 165, then control element 15 increments the corresponding first error count value by one in step 169. Subsequently, control element 15 refers to the PIN collation status area corresponding to the index in step 181, reads out the contents of the area and sets the corresponding PIN collation status bit to "0" in step 183, issues response data indicating the non-coincidence of the PINs in step 185, and enters into the wait state for instruction in step 121.

As a result of collation of the upper four bits of the error limit area with the first error count value in step 165, if the first error count value is larger than the error limit value, then control element 15 refers to the second error count area corresponding to the index and reads out the contents of the area in step 167 and compares the second error count value with the corresponding limit value (lower four bits) in step 171. If the second error counter value is smaller than the second error limit value in step 171, then control element 15 increments the value of the corresponding second error counter value by one in step 179. Subsequently, control element 15 refers to the PIN collation status area corresponding to the index in step 181, reads out the contents of the area and sets the corresponding PIN collation status bit to "0"in step 183, issues response data indicating the non-coincidence of the PINs in step 185, and enters into the wait state for instruction in step 121.

On the other hand, if the second error count value is larger than the corresponding limit value in step 171, then control element 15 refers to the PIN collation status area corresponding to the index in step 173 and reads the contents of the area and sets the corresponding collation status bit to "0" in step 175. Control element 15 then issues response data indicating that the PIN is non-usable in step 177 and enters into the wait state for instruction data in step 121.

As shown in FIG. 9, the area numbers "12" and "13" of the error counter area correspond to indexes "32", "33"; and indexes "33", "35", respectively. This means that the same error counter is used for collation with the PIN corresponding to the index "32" and the PIN corresponding to the index "33". The same is true of the indexes "34" and "35". Further, the error limit value is used in common particularly for the indexes "34" and "35" (the area number "24" is used in common). For this reason, if the second error counter reaches the limit value in the collation with the PIN using the index number "34", then the collation with the PIN using the index "35" would also become impossible.

Furthermore, as shown in FIG. 9, the PIN collation status areas corresponding to indexes "32" and "33" indicate the same area number of "42". Hence whichever of the PINs may be used for collation, the first bit in FIG. 13 is set to "1" as the collation status flag. That is, the collation status flag of FIG. 13 constitutes holding means for holding information (collation status bit) on the affirmative result for collation, the information being inherent in each PIN. In this example, the PINs for indexes "32" and "33" share one collation status bit (the first bit).

The operation of writing transaction data will next be described with reference to a flowchart shown in FIG. 19. If an entered instruction is not an instruction for PIN collation in step 121 of FIG. 18A, then control element 15 determines whether the next entered instruction data is transaction-data-write-instruction data having such a format as shown in FIG. 20 or not. The transaction-data-write-instruction data is comprised of a transaction data write function code 211, area designation data 213 and write data 215. If the entered instruction is not the transaction-data-write-instruction data in step 191, control element 15 decodes the function code in the instruction data, executes a corresponding process, and then issues response data for the execution result for the process in step 193 and enters into the wait state for instruction data in step 191.

If the instruction data is regarded to be transaction-data-write-instruction data in step 191, then control element 15 searches, in step 195, transaction data area definition table 39 in data memory 16 for the area number which is coincident with area designation data 157 in the instruction data. If it is determined in step 197 that the area number is not found, then control element 15 issues response data indicating that the area is not defined in step 199 and enters into the wait state for instruction data in step 121.

If the area number is found, then control element 15 refers to access condition data (63 in FIG. 7) corresponding to the area number in step 201 and determines whether the collation status bit indicated by the access condition data is "1" or not in step 203. If the collation status bit is "0", control element 15 issues response data indicating that the access is impossible in step 205 and enters the wait state for instruction data in step 121. If the collation status bit is "1", on the other hand, then control element 15 performs a process for writing the transaction data in step 207, issues response data corresponding to the result of data writing in step 209 and enters into the wait state in step 121.

Referring to FIG. 7, the access condition data is "04" for area number "80". Thus, if the second bit of the collation status bit of FIG. 13 is set to "1", then the transaction data can be written. Hence, if the collation with the PIN using index "34" has correctly been completed, then data can be written into area "80" within data area 35. In addition, since area number "81" is associated with the first bit of the collation status bits, if the collation with the PIN using index "32" or "33" has correctly been completed, data can be written into area "81" within data area 163.

As described above, by sharing the inherent information (collation status bits) on the affirmative result of collation among a plurality of registered PINs, it becomes possible to prevent the memory area for storing the information on the positive result of collation from being increased and the reference to the information during subsequent operations in the IC card from being complicated. Further, a flexible IC card system can be built.

Moreover, noncoincidence in the PIN collation is counted and the accumulated value (error counter value) of the number of times of the noncoincidence is compared with the limit value each time the noncoincidence occurs. When the accumulated value is below the accumulated value, the control element issues the first noncoincidence information, namely, response data indicating the noncoincidence in the PIN collation, while, when the accumulated value exceeds the upper limit value, the control element issues the second noncoincidence information, namely, response data indicating that the PIN is unusable.

Therefore, even if external equipment previously knows no upper limit value for a PIN for collation, a determination can easily be made as to whether the number of noncoincidences has arrived at the upper limit value or not. Accordingly the security of the IC card system can be maintained and, even if a plurality of PINs are registered, the external equipment will not be burdened with control.

A second embodiment of the present invention will be described hereinafter.

In the second embodiment, each of nonvolatile and volatile memories is provided with a noncoincidence counter for one type of PIN. When a noncoincidence is detected during the PIN collation the noncoincidence counter in the nonvolatile memory is first incremented by one and subsequent count operations are performed by the noncoincidence counter in the volatile memory. When the noncoincidence counter in the nonvolatile memory counts a predetermined value, the noncoincidence counter in the nonvolatile memory is incremented by one and the noncoincidence counter in the volatile memory is initialized. When the noncoincidence counter in the non-volatile memory counts a predetermined value, the use of the PIN under collation is prohibited.

Figure 21B:
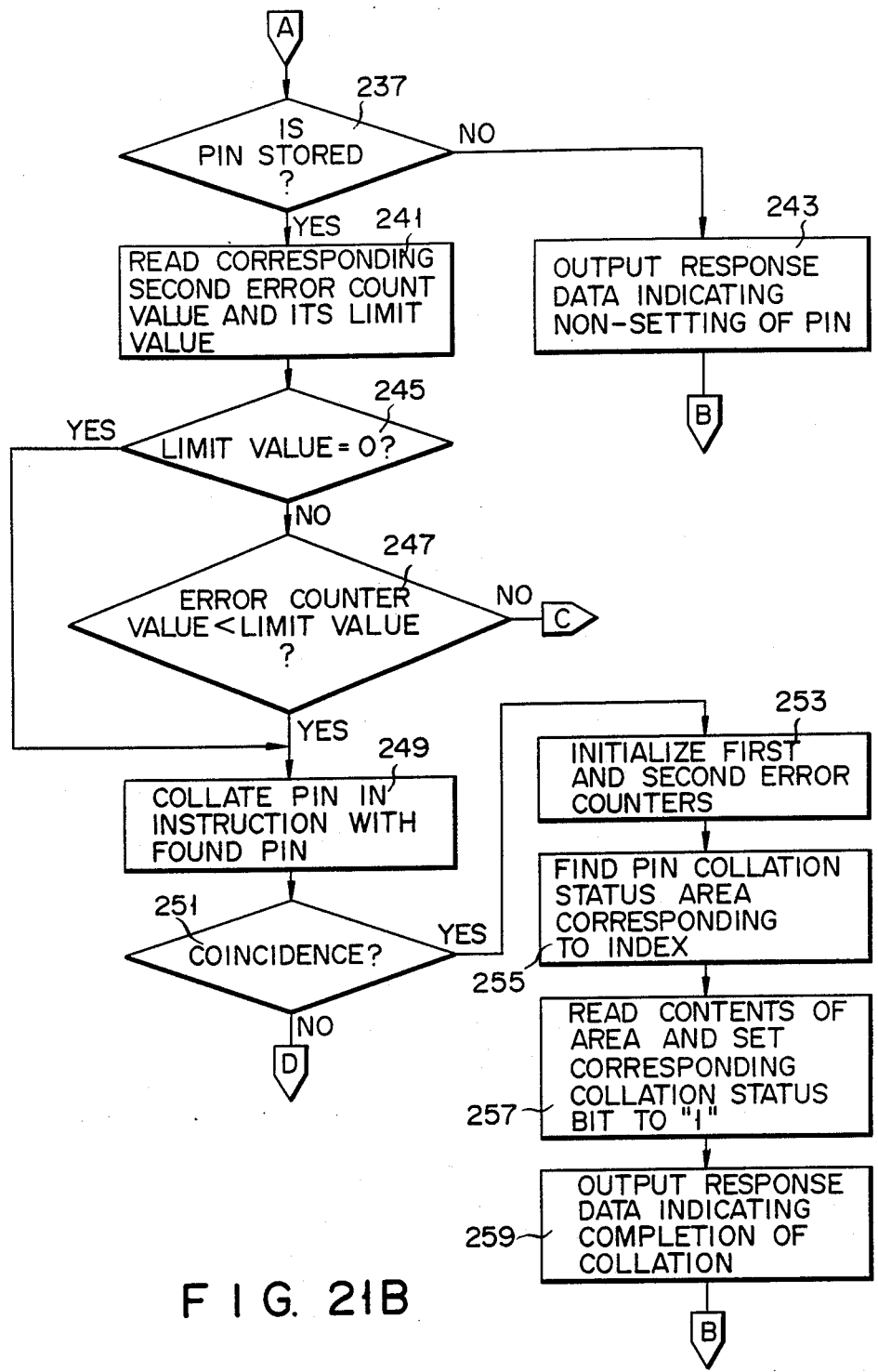
Figure 21C:
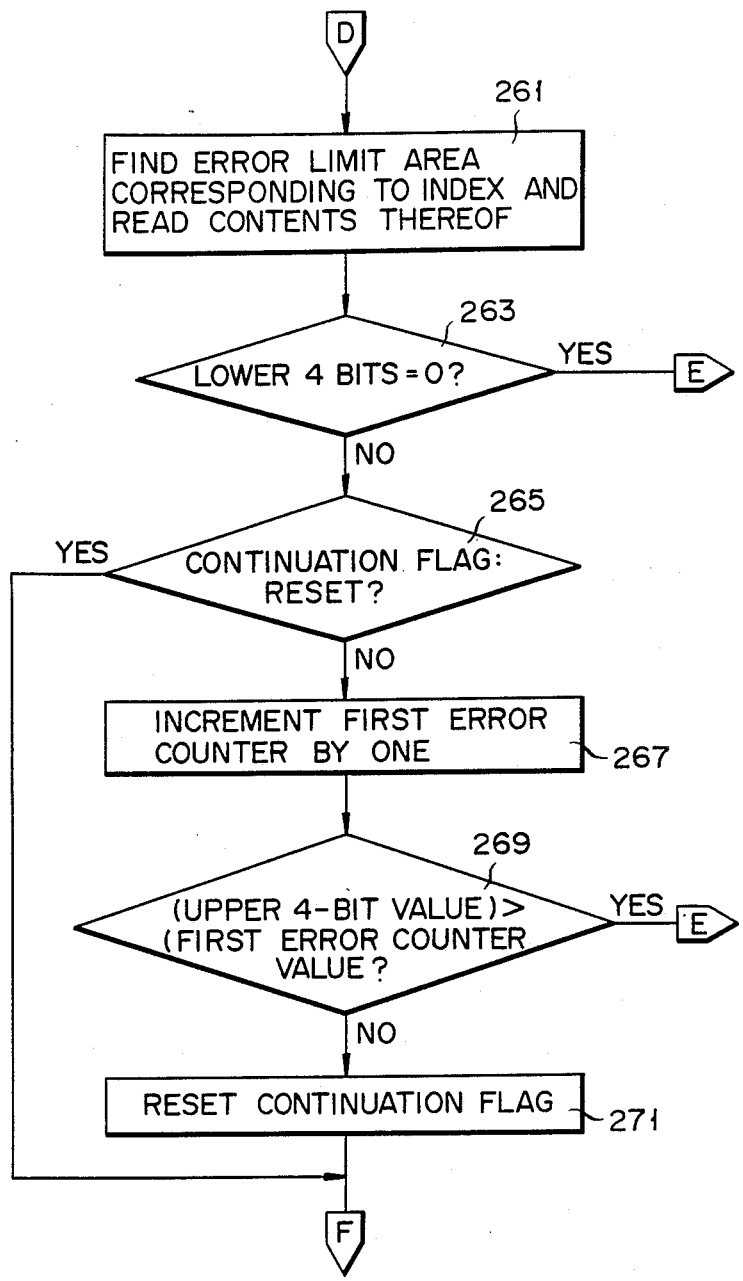
Figure 21D:
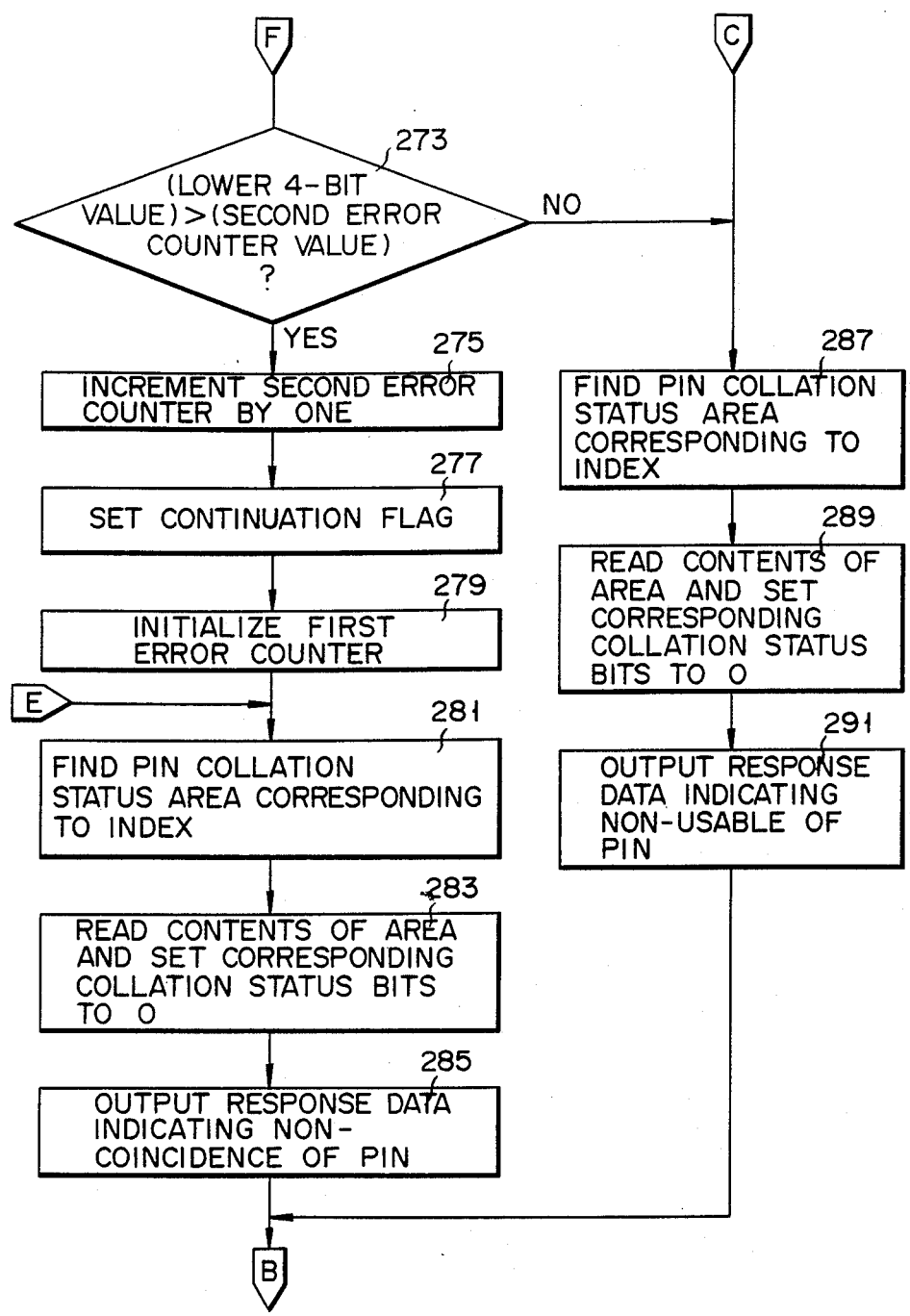

The PIN collating operation according to the second embodiment will be described hereinafter with reference to a flowchart of FIGS. 21A through 21D. Steps 221 through 259 of FIGS. 21A and 21B are the same as steps 121 through 157 of FIGS. 18A and 18B and thus the description thereof will be excluded.

In step 261, control element 15 refers to the error limit area corresponding to the index and reads out the contents of the area to determine whether the lower four bits (the limit value of the second error counter) are "00" or not in step 201. If they are "00", then control element 15 refers to the PIN collation status area corresponding to the index in step 281, reads the contents of the area and sets the corresponding collation status bit to "0" in step 283, issues response data indicating the noncoincidence in the PIN collation in step 285, and enters into the wait state for instruction data in step 221.

If the lower four bits are not "00" in step 263, then control element 15 refers to the continuation flag provided in its RAM in step 265. When the continuation flag is on, the first error counter is incremented by one in step 267. Afterward control element 15 makes a comparison between the upper four bits of the error limit value and the first error counter value in step 269. As a result of this comparison, if the former is larger than the latter, then control element 15 refers to the PIN collation status area corresponding to the index in step 281, reads the contents of the area and sets the corresponding PIN status bit to "0" in step 283, issues response data indicating the noncoincidence in the PIN collation in step 223, and enters into the wait state for instruction data in step 161.

If the upper four bits of the error limit area is not larger than the first error counter value in step 269, control element 15 resets the continuation flag in step 271, refers to the second error counter area corresponding to the index and reads the contents of the area to make a comparison between the second error counter value and the corresponding limit value (the lower four bits) in step 273. When the continuation flag is off (reset) in step 265, step 273 is performed at once. If the limit value is larger than the second error counter value, control element 15 increments the corresponding second error counter by one in step 275, sets the continuation flag in step 277, and initializes the first error counter value to "00" in step 279. Control element 1 refers to the PIN collation status area corresponding to the index in step 281, reads the contents of the area and sets the corresponding PIN status bit to "0" in step 283, issues response data indicating the noncoincidence in the PIN collation in step 285, and enters into the wait state for instruction data in step 161.

If the limit value is not larger than the second error counter value, then control element 15 refers to the PIN collation status area corresponding to the index in step 287, reads the contents of the area and sets the corresponding PIN status bit to "0" in step 289, issues response data indicating that the corresponding PIN is unusable in step 291, and enters into the wait state for instruction data.

When a reset signal for control element 15 is turned off so that control element is started, the continuation flag in the RAM remains off. Hence, when a noncoincidence occurs in the PIN collation, the second error counter is first incremented by one and then remains as it is until the first error counter exceeds its limit value. Consequently the second error counter is necessarily counted up even if the PIN collation results in noncoincidence.

Accordingly, in using the present IC card with a magnetic card system, the process of the system for noncoincidence in the PIN collation can be implemented without complicating internal controls within the IC card. In addition, since the noncoincidence status in the PIN collation can surely be saved in the second error counter (nonvolatile memory), there is no possibility that the PIN is detected and thus the present IC card is excellent in security.

In the above embodiments, the portable electronic device of the present invention is described as an IC card. However, the portable electronic device need not be limited to a card type and may be of a block type or a bar type, for example. The configuration of hardware of the portable electronic device may be modified in various ways without departing from the scope of the present invention.

What is claimed is:

1. A portable electronic device, comprising:
   first storage means, for storing a plurality of first data strings;
   collation means for collating an externally entered second data string with one of said first data strings stored in said first storage means to determine whether a predetermined relationship exists therebetween;
   second storage means for storing status information representing the predetermined relationship which is inherent in said one of said first data strings, when said comparing means determines the predetermined relationship being existed; and
   means for causing said second storage means to store the same status information, corresponding to two of the first data strings, representing the existence of the predetermined relationship of the collation so that at least two of said first data strings may have the same status information on the existence of the predetermined relationship.

2. A portable electronic device according to claim 1, further comprising:
   count means for counting the number of non-existence of the predetermined relationship from the comparison of said first data strings stored in said first storage means with the externally entered second data string; and
   third storage means, for storing at least one of count values counted by said count means, at least two of said first data strings using the same count value stored in said third storage means.

3. A portable electronic device according to claim 1, further comprising:
   fourth storage means for storing at least one error limit value for the number of non-existence of the predetermined relationship from the comparison of the first data stirng stored in said first storage means with the externally supplied second data string, at least two of said first data strings using the same error limit value stored in said fourth storage means.

4. A portable electronic device according to claim 1, wherein said first storage means is constituted by a nonvolatile memory; and each of said first data strings is a personal identification number.

5. A portable electronic device according to claim 1, wherein each of said first and second data strings is a personal identification number; and the status information representing the existence of the predetermined relationship is information which indicates coincidence between personal identification numbers.

6. A portable electronic device comprising:
   first storage means for storing a plurality of first data strings;
   collating means for collating an externally entered second data string with one of said first data strings stored in said first storage means, to determine whether a predetermined relationship exists therebetween; and
   output means for selectively outputting, when the result of the collation by said collation means is non-existence of the predetermined relationship, one of at least two non-existence-of-the-predetermined-relationship response data in accordance with the state of a subsequent process to be performed.

7. A portable electronic device according to claim 6, wherein one of non-existence-of-the-predetermined-relationship response data is data indicating unusability of said one of said first data strings.

8. A portable electronic device according to claim 6, wherein one of non-existence-of-the-predetermined-relationship response data is data indicating noncoincidence between said first and second data strings.

9. A portable electronic device according to claim 6, further comprising:
   count means for counting the non-existence-of-the-predetermined-relationship results from said collation means; and
   output means, including storage means for storing a limit value for the number of non-existence-of-the-predetermined-relationship results, for outputting response data indicating nonusability of one of said first data strings when the number of non-existence-of-the-predetermined-relationship results counted by said count means exceeds the limit value, and response data indicating noncoincidence between said first and second data strings when said first and second data strings are not coincident with each other.

10. A portable electronic device according to claim 6, wherein each of said first and second data strings is a personal identification number.

11. A portable electronic device comprising:
   first storage means, for storing a plurality of first data strings;
   collating means for collating an externally entered second data string with one of said first data strings stored in said first storage means, to determine whether a predetermined relationship exists therebetween;
   first count means, for counting at least one count when the result of the first collation by said collating means after the start of said portable electronic device is non-existence-of-the-predetermined-relationship;
   second storage means, constituted by a nonvolatile memory, for storing a count value by said first count means;
   second count means, for counting the number of non-existence-of-the-predetermined-relationship results of collation from said collating means after the counting by said first count means;
   control means for causing said first count means to count at least one count and initializing said second count means when the count value counted by said second count means reaches a predetermined value; and
   means for prohibiting the use of said one of said first data strings when the count value in said second storage means reaches a predetermined value.

12. A portable electronic device according to claim 11, wherein each of said first and second data strings is a personal identification number.

13. A portable electronic device according to claim 11, wherein each of said first and second count means counts the number of noncoincidences between said first and second data strings.

* * * * *